United States Patent Office 3,538,727
Patented Nov. 10, 1970

3,538,727
DEVICE FOR REGULATING THE THICKNESS OF ROLLING-MILL PRODUCTS AND ROLLING-MILLS EQUIPPED THEREWITH
Claude Guillot, St. Chamond, France, assignor to Compagnie des Ateliers et Forges, de la Loire St. Chamond, Firminy, St. Etienne, Jacob Holtzer and Hydromecanique et Frottement, Paris, and St. Etienne, France
Filed Nov. 14, 1967, Ser. No. 682,788
Claims priority, application France, Dec. 19, 1966, 87,948
Int. Cl. B21b 37/12, 37/08
U.S. Cl. 72—8                                  6 Claims

ABSTRACT OF THE DISCLOSURE

A regulating device for the thickness of a rolled product having a regulator jack whose piston can be displaced under the effect of pressure variations of a grease filling the space between said piston and a bore in which it is displaced. A piston projects into the grease and its entrance and retreat brings about displacements of the piston of the jack. A hydraulic jack actuated by a servovalve controls the plunger piston. Means are provided for capturing the variations of the position of the plunger piston and consequently the variations of the screwing down of the rolling mill. Means capture the value of the pressure of the grease and therefore the variations of the effort of the rolling. Means determine the real position of the plunger piston to its desired position and means give a compensation signal defining such desired position.

---

This invention is concerned with means adapted to be incorporated in rolling-mills for regulating the thickness of rolling-mill products.

It is advantageous to obtain rolled products having a predetermined and constant thickness. Various devices have been proposed with a view to achieve this result.

The basic principle on which these known devices are constructed is always the same: to each variation in the rolling effort there corresponds a concomitant variation in the distance between centers of the rolling mill rolls as a function of the stress applied to the various component elements of the roll stand. It is customary to use the term "rolling-mill yield" to denote the degree of variation in the relative distance between the generatrices of the rolls concerned which was caused by this stress. Therefore, if a constant-thickness product is desired, some means must be provided for controlling the gap of the rolling-mill rolls during the operation (the term "gap" meaning the distance between the rolls under zero rolling pressure conditions).

This implies the combination of different means:

(a) Means for measuring the yield or rolling effort either directly or through the medium of a concomitant magnitude;

(b) Means capable of modifying the gap under load;

(c) Means capable of measuring the gap variations;

(d) Means maintaining the desired relationship between the rolling effort and the gap variation.

Various devices have been proposed for embodying the above-listed means.

Thus, means capable of modifying the gap under load by rotating adjustment screws have been proposed, which involved the use of powerful motors. Such motors are objectionable not only on account of their high cost but also their considerable inertia which prevented the system from modifying the previous adjustment within satisfactory time limits.

Hydraulic actuators of the cylinder-and-piston type have also been used for controlling the gap under load. This method is free of the inconveniences characterising screw regulating means but it is attended by other drawbacks inter alia:

The considerable over-all dimensions involved, which are due not only to the relatively long piston guiding stroke in the cylinder but also to the considerable height of the piston and rod packings;

The high pressure values required which prevent these actuators from attaining a reliable fluid-tightness and these pressures are furthermore attended by sudden variations or surges putting a severe strain on the lips of the packings (for example when the bloom or ingot is inserted between the rolls of the stand).

As a hydraulic actuator of the above-mentioned type is resilient due to the compressibility of the fluids and to the distorsion caused in the packings, the rolling-mill yield and therefore the time required for making the corresponding corrections are increased.

Moreover, the elasticity of this actuator is subject to contingencies such as the frictional contact between the piston and the actuator cylinder bore, the variable configurations assumed by the packings of which the distorsion is counteracted by the frictional contacts, the variations in the compressibility of the fluid (due for example to variations in the volume and pressure of the fluid, and also to the quantity of air dissolved therein).

Now the fact of maintaining the rolls of a rollstand at a predetermined distance between centers by using a device of dubious elasticity constitutes an obvious source of inaccuracy.

The rolling effort cannot be measured with precision from the measurement of the fluid pressure, due to the frictions mentioned hereinabove.

On the other hand, the plummer-block movements (horizontal movements and lateral tilting movements) produce considerable shocks and strain between the piston and cylinder of the cylindrical actuator, thus reducing the useful life of these parts and also of the packings used therein.

Furthermore the lack of precision of the gap measurement cannot be disregarded due to the undesired movements of the piston in its actuator body which are caused by plummer-block movements (as a matter of fact, the gap measurement is the measurement of the position of the actuator piston in its cylinder).

A third example of the type of devices proposed heretofore consists of a kind of fluid-operated actuator wherein the oil was replaced by a deformable but incompressible material such as rubber, in which a hand-operated screw rod was more or less embedded; however, in this system the above-listed inconveniences of the other two systems were accumulated.

It is an essential object of the present invention to provide a device referred to hereinafter as a "thickness regulator," which is capable, in a roll-stand, to modify the gap under load, to measure the gap variations and the rolling effort, to transmit the data corresponding to these measurements in the form of electric signals, to make the incoming and emitted signals responsive to a predetermined law and these different results are obtained with a hitherto unknown degree of precision and quickness of response.

The thickness regulator according to this invention is adapted to be mounted in the uprights of a rolling-mill stand, either between the upright and the bottom plummer-block or between the screw-down device and the top plummer-block, and it comprises a regulator actuator of the cylinder and piston type, wherein the piston is responsive to pressure variations of a material filling the space between the piston and the bore in which it is movable;

a plunger piston penetrating into said material and of which the more or less pronounced engagement in said material controls the movements of said actuator piston; means for controlling the position of said plunger piston; other means responsive to variations in the position of said plunger piston, i.e. the rolling-mill gap variations; means responsive to the variations in the rolling effort value which may consist of means responsive to the value of the pressure of said material in said space, means for subordinating the actual position of said plunger piston to the proper and desired position, and means for releasing a compensation signal corresponding to the definition of said desired position.

The rolling effort may be found from the value of the pressure produced in said material, but this form of embodiment should not be considered as limiting the invention, since any other suitable means may be used for measuring the rolling effort.

Moreover, the compensation signal may be derived for example from data such as the rolling effort, the gap value, and other data such as the measurement of the thickness value of the product, the rolling speed, etc.

According to a typical feature characterising this invention the means controlling the position of said plunger piston consist of a hydraulic actuator operated by a servo-valve responsive to said means for subordinating its actual position to the desired position.

According to this invention the hydraulic actuator controlling the plunger piston comprises a projecting rod rigid with the plunger piston, the movements of said rod being measured by a plunger piston position detector. This detector constitutes one of the means provided for setting the plunger position to the desired position.

According to another feature characterising the present invention the material of which the pressure variations cause the movements of the piston of the regulator is selected to have zero or nearly zero compressibility and a viscosity such that in a duct having the magnitude of the clearance existing between the piston and the bore receiving the piston the pressures are transmitted with a certain time-lag, whereas in ducts having greater cross-sectional dimensions the pressures are transmitted almost instantaneously.

A further object of this invention is to provide means for transmitting to the piston of the regulator actuator the load components parallel to the piston axis which are applied to said last-named means and preventing these load components from being transmitted when they have a different direction. The above means are interposed between said piston and a plummer-block of the roll stand, or between said piston and the screw-down device of the roll stand.

According to another feature characterising the present invention the above-mentioned means consist of a membrane clamped along the whole or part of its outer periphery.

Other objects and advantages will appear from the following description with reference to the accompanying drawings illustrating diagrammatically by way of example a typical form of embodiment of the invention. In the drawings:

FIG. 2 shows in diagrammatic form by way of example two possible methods of incorporating the device of this invention in a roll stand.

In fact, this regulator can be mounted either at D beneath the bottom plummer-block E, or at D' beneath the screwdown device S of the roll stand.

Figure 1:
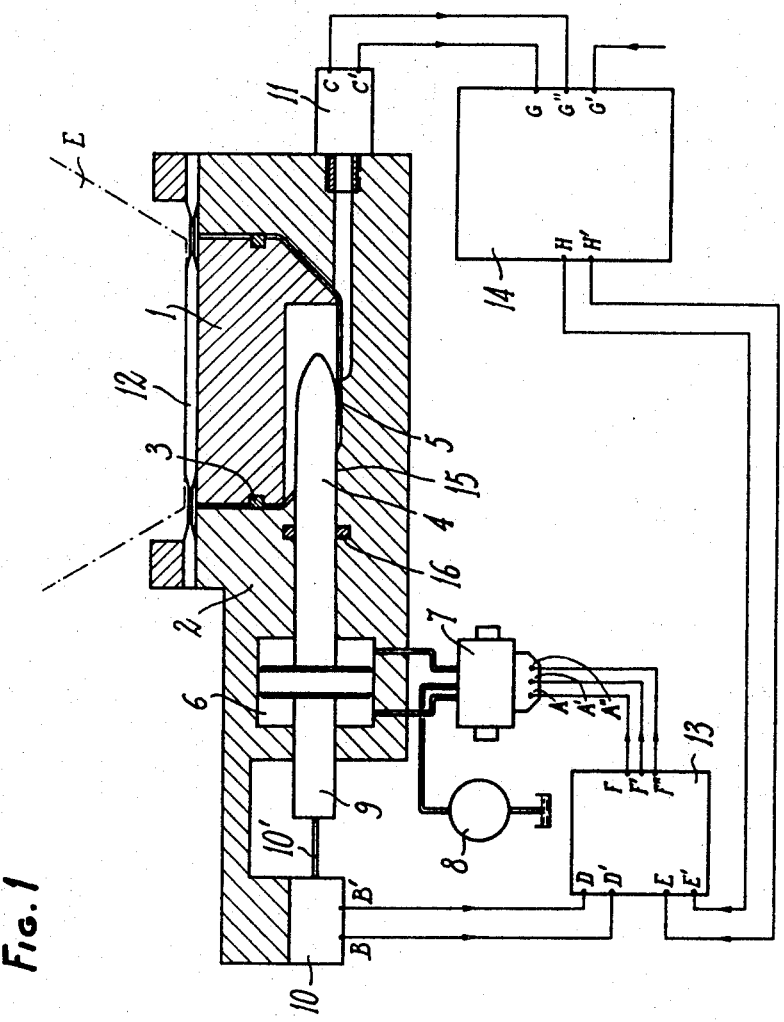
FIG. 1 illustrates in section a thickness regulator with the wiring diagram of the electrical system for controlling this device being also shown in this figure to facilitate an understanding of the mode of operation of the device.
Figure 2:
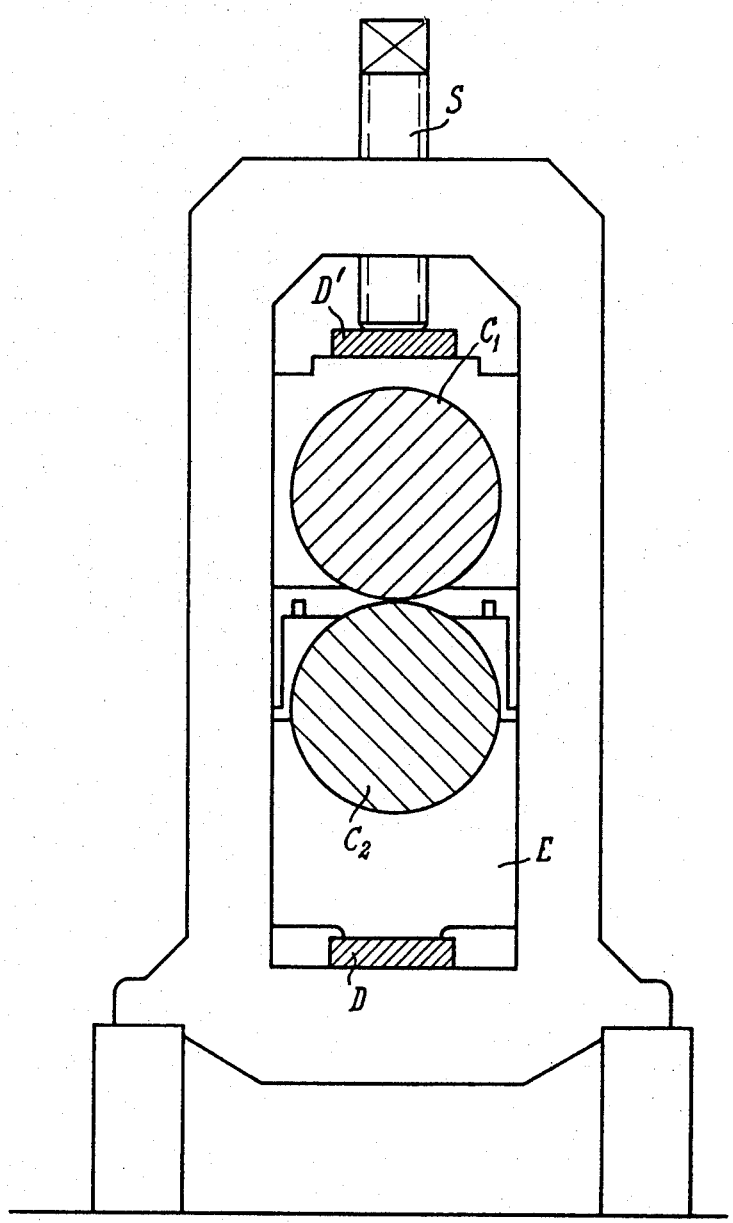
FIG. 2 illustrates diagrammatically the manner in which the device can be incorporated in a roll stand.

Referring to FIG. 1 it will be seen that the thickness regulator comprises essentially an actuator of the piston and cylinder type, i.e. comprising a piston 1 and an actuator body or cylinder 2 formed with a bore in which the piston 1 is slidably mounted. A piston packing 3 is provided to prevent any leakage between the piston 1 and body 2.

The body 2 of this actuator further comprises a lower bore 15 having slidably mounted therein a piston 4 to be referred to herein as the plunger piston. Packing such as 16 are provided to ensure the maximum fluid-tightness between the piston 4 and bore 15.

The space formed between the surfaces of piston 1, body 2 and plunger piston 4 is filled with a material 5 having original rheological properties, and of which the composition will be disclosed presently.

The means provided for controlling the position of said plunger piston 4 consists of a hydraulic actuator 6 fed from a suitable source 8 of fluid under pressure under the control of a servo-action valve 7; the actuator 6 and servo-action valve 7 are designed to have the minimum response time. The hydraulic actuator 6 controlling the movements of the plunger piston 4 is provided with a projecting rod 9; therefore, this rod 9 is rigid with the plunger piston 4. The position of rod 9 and therefore of plunger piston 4 is measured by a displacement pick-up or detector unit 10 comprising a feeler 10' solid with said rod 9.

The pressure obtaining the aforesaid material 5, which corresponds to the rolling effort and therefore as a first approximation to the roll stand yield, is measured by another pick-up or detector unit 11.

Finally, a means 12 referred to hereinafter as the "diaphragm" and to be described more in detail presently is interposed between the top face of piston 1 and a plummer-block or the screw-down device of the roll stand, this diaphragm having a flexibility sufficient to yield completely when a load is applied thereto and to have its shaped altered completely in the direction of this load; on the other hand, the stiffness of this diaphragm in the flat condition is sufficient to prevent the lateral plummer-block efforts from being transmitted between the piston 1 and body 2.

The reference symbols A, R', A''; B, B'; C, C' denote the electrical wiring connections respectively of servo-action valve 7, pick-up unit 10 for detecting the movements of plunger piston 4, and pick-up unit 11 for detecting the pressure developed within the material 5; besides, D, D'; E, E' and F, F', F'' designate the wiring connections of a position responsive servo-action unit 13, and finally H, H'; G, G', G'' denote the wiring connections of a circuit adapted to deliver a signal corresponding to the necessary compensation of the rolling effort and therefore of the roll-stand yield. This last-mentioned equipment (i.e.; servo-action unit 13 and compensator) will be described presently.

The above-described regulator device of this invention operates as follows:

The principle of operation of the thickness regulator is such that when as a consequence of an impulse received from a suitable pick-up device or detector unit the servo-action valve 7 feeds the hydraulic actuator 6 with pressure fluid, the plunger piston 4 is moved; as a result, a pressure variation takes place within the material 5 and thus the regulator piston 1 is moved and causes the shape of diaphragm 12 to be altered, thus modifying the gap of the rolling cylinders.

The manner of selecting a detector and apparatus capable of producing the impulse for controlling the servo-action valve 7 so that the thickness of the product delivered from the roll stand be independent of the heterogeneous nature of the product upstream of the same roll stand will now be explained by way of example.

To simplify the disclosure it will be assumed that:

(1) The hydraulic fluid output delivered by the servo-action valve 7 to control actuator 6 is proportional in both magnitude and sign to the electric voltage available across the terminals A, A', A" of this servo-action valve (or to the current intensity, or to any other adequate magnitude, according to the particular nature of this servo-action valve).

(2) The electric voltage (or any other suitable magnitude as explained in paragraph (1) hereinabove) across terminals B, B' of the displacement pick-up unit 10 is proportional to the position of piston rod 9 expressed in relation to a certain origin.

(3) The electric voltage (or any other siutable magnitude) available across the terminals C, C' of pressure cylinder 11 is proportional to the pressure existing within the material 5.

Experience teaches that this pressure is proportional in turn to the rolling effort and therefore, at least as a first approximation, to the roll stand yield.

The electronic equipment provided in this example comprises:

(a) Means for controlling the position of plunger piston 4 as detected by the pick-up unit 10 (terminals B, B') shown diagrammatically in the drawing as a block 13. This block designates an equipment which, having received at a first set of terminals D, D' a signal denoting the momentary position of the movable member to be controlled (in this case the plunger piston 4), and, at a second set of terminals E, E', a signal referred to as the "noted signal," corresponding to the desired position of said movable member, is adapted to deliver an output signal collected across terminals F, F', F", capable of modifying the condition of the control member, i.e. the actuator 6 in this case, by operating the servo-action valve 7 in such a manner that the position of said movable member, i.e. the plunger piston 4, is changed to the desired position.

(b) A circuit for producing the compensator signal, which is shown in block form at 14 in the drawing. In the specific form of embodiment of the invention which is illustrated herein by way of example this circuit consists of an add-on adjustable-gain operational amplifier. This term denotes an apparatus receiving a plurality of signals $a$, $b$, $c$, at its input terminals and delivering an out signal proportional to the quantity $1.a + m.b + n.c \ldots$; $l$, $m$, $n$ denoting algebraic constants depending on the constructional characteristics of the apparatus.

In this specific example the amplifier 14 receives across its input terminals G, G" a signal corresponding to the pressure produced within the material 5, as picked up or detected by the unit 11, a zero-shift signal being applied if desired across its terminals G' and G".

The amplifier 14 delivers at its output terminals H, H' a signal proportional, except if desired for a constant, to the pressure prevailing in said material 5 and therefore to the rolling effort and eventually to the roll-stand yield.

It will be seen that given a proper selection of the coefficient of proportionality and a suitable direction of the wiring connections, this signal may actually be equal to the amount by which the value of the signal controlling the position of the servo-action unit 13 has to be modified for moving the plunger piston 4 and therefore produce a change in the gap which is just equal to said yield, save for a constant.

Therefore, by connecting the output H, H' of amplifier 14 to the input E, E' of servo-action unit 13, and by properly adjusting the gain of amplifier 14, any variation in the rolling effort is attended instantaneously, via the pressure pick-up unit 11, amplifier 14, servo-action unit 13, servo-valve 7 and actuator 6, by a gap variation just equal to the yield variation, so that the distance between the active generatrices of the roll-stand cylinders remains unchanged and the thickness of the product issuing therefrom remains constant.

The principle of the automatic and continuous thickness regulator according to the present invention as described hereinabove, and the mode of operation thereof, are original and lead to novel effects for this device combines an actuator filling material having original rheological properties with an elastic diaphragm for producing the following novel effects:

(i) The fluid-tightness is complete and the distortion to which the packings may be submitted as a consequence of peak surges in the pressure prevailing in the material filling said space is nearly zero; under these conditions, the volume of said space remains strictly constant and the position of plunger piston 4 shows very exactly the height of piston 1 and plummer block E.

(ii) The rolling effort can be read with the maximum precision at any time from the measurement of the pressure prevailing in the material 5, since no stray friction takes place, for example between the cylinder and piston.

(iii) As a corollary, a strict faultless control is constantly exerted on both the rolling effort and the yield value.

An exemplary form of embodiment of the diaphragm 12 according to this invention is illustrated in FIG. 1. This diaphragm has two opposite sides clamped against the actuator body 2 and can move relatively freely within certain limits in the stress direction, to an extent sufficient to permit the movement of piston 1; on the other hand the stiffness of this diaphragm in its flat condition absorbs all the plummer-block reactions without transmitting them to the piston connected thereto; on the other hand this diaphragm tolerates the relatively ample tilting movements of the plummer-block.

Another modified and exemplary form of embodiment of the diaphragm according to this invention may consist of a rigid member connected by hinge means to one of the sides of the actuator body 2.

Of course, these two examples are given by way of illustration, not of limitation, and any diaphragm capable of absorbing the lateral reactions of the plummer-block and to thus protect the cylinder and piston assembly while permitting a movement without any apparent resistance in the rolling direction may constitute an adequate means of which the simultaneous use characterises the present invention.

The other means contemplated for carrying out this invention is the material filling the space provided between the surfaces of members 1, 2 and 4. This material must have the following properties:

(I) A perfect fluidity (i.e. the ability to transmit pressure) when spaced sufficiently from the walls, on the one hand for enabling the pressure detector or pick-up unit 11 contacting this material to give information independent of its orientation and position, this information providing a clear indication of the effort exerted on piston 1, and on the other hand, in case of sudden withdrawal of plunger piston 4 during the regulation, the space from which this plunger piston 4 is retracted must be filled almost instantaneously with said material.

(II) The compressibility rate of this fluid must be as low as possible (at least 10 times lower than that of a conventional hydraulic transmission oil in the case of the aforesaid material), so that the volume of the space filled by this material remains constant irrespective of the pressure variations occurring therein.

(III) The viscosity of this material must be high enough to definitely prevent or at least strongly damp out any sudden pressure transmission from the space provided between the piston 1 and its bore in body 2 to the seal or packing. This requirement is obvious for if sudden pressure variations were capable of causing a more or less pronounced distortion of the seal or packing, this would detrimentally affect the volume of said space.

(IV) On the other hand, this viscosity should not impair the fluid-tightness, for it is known that conventional sealing means are inadequate for preventing leakages when high-viscosity fluids are used, and any leakage would likewise bring about a detrimental change in the volume occupied by said space.

Now no conventional or known substance is capable of meeting all the above-listed requirements of the above-defined material of the present invention, due to its multiple and contradictory properties; however, this material can be obtained by mixing different substances.

A typical, exemplary and non-limiting example of the material according to this invention is obtained by mixing together:

200 parts by weight of calcium-soap grease,
100 parts by weight of micron-size graphite,
20 parts by weight of sodium tri-stearate.

Experiences teaches that with this material, mixed in the heated state by using a water bath, a material is obtained which has exactly the above-defined requisite properties.

With this material and a 5-millimeter thick diaphragm clamped at its end, a thickness regulator according to this invention was constructed wherein the actuator of the cylinder and piston type had a diameter of 190 millimeters and a rated pressure of up to 400 bars or 5,800 p.s.i.; embedded in the actuator filling material was a pressure pick-up member; the diameter of the plunger piston was 30 mm., its stroke was 20 mm., and the actuator 6 was controlled by a servo-action valve. The correction amplitude was ±0.25 mm., or .01″, and by using a suitable electron servo unit, metal sheets having a constant thickness of ±0.01 mm. were obtained, with a response time of less than 0.05 second.

Moreover, 3,000,000 corrections under maximum amplitude conditions were made without recording any packing wear or diaphragm rupture.

It would not constitute a departure from the present invention to use a plurality of plunger pistons 4 in the regulator described herein.

Thus, a second plunger piston may be mounted for safety reasons, this additional or emergency piston being forced out by the material in the case the rolling effort attained excessive values.

The applicant further found, quite unexpectedly, that the above-described device could be used for measuring an effort by measuring the pressure obtaining in the material filling the bore 15 of the regulator actuator, due notably to the perfect fluid-tightness of this actuator.

As a result and as will be readily apparent from the above description and the appended drawings, an apparatus capable of measuring such efforts may be used which comprises essentially an actuator body 2, a piston 1, packings 3, a diaphragm 12, a pressure pick-up device 11 and a material of the kind specified herein-above filling this actuator; the efforts are measured by the pick-up unit 11, this measuring operation being facilitated by the complete fluid-tightness of this actuator and by the absence of reactions between the piston 1 and the body 2.

Of course, many modifications and variations may be brought to the specific forms of embodiment shown, described and suggested herein, without inasmuch departing from the spirit and scope of the invention as set forth in the appended claims.

What is claimed is:

1. A regulating device for controlling the thickness of a rolled product located adjacent an upright of a rolling mill, comprising a regulator jack comprising a piston and a bore for said piston, said piston being displaceable under the effect of pressure variations of a grease filling the space between said piston and said bore, a plunger piston projecting into said grease and whose extension and retraction bring about displacements of said piston of said jack, a hydraulic jack actuated by a servo-valve in order to control the position of said plunger piston, means sensing the variations of the position of said plunger piston and consequently the variations of the gap of the rolling mill, means sensing the value of the pressure of said grease in said space and therefore the variations of the effort of rolling, means for bringing the real position of said plunger piston to its desired position and means for giving a compensation signal defining such desired position to said servo-valve.

2. An arrangement according to claim 1 wherein said device is located between the upright and lower plummer-block.

3. A device as set forth in claim 1 wherein said device is located between a screw-down device and the upper plummer-block.

4. A device as set forth in claim 1 wherein said hydraulic jack being connected to said plunger piston by a rod fixed thereto.

5. A device according to claim 1 wherein said grease is formed by a mixture carried out hot in a water bath comprising 200 parts by weight of calcium-soap grease, 100 parts by weight of graphite having a particle size of the order of 1 micron and 20 parts by weight of sodium tri-stearate.

6. A device as set forth in claim 1 wherein a membrane is embedded upon the periphery of the body of said regulator jack, whose amplitude of movement in the direction of the effort of rolling allows the displacement of the piston of said jack and whose stiffness while plane absorbs lateral variations of the plummer-block.

References Cited

UNITED STATES PATENTS

| | | | |
|---|---|---|---|
| 3,285,049 | 11/1966 | Neumann | 72—246 |
| 3,286,495 | 11/1966 | Diolot | 72—8 |
| 3,327,508 | 8/1967 | Brown | 72—245 |
| 3,389,588 | 6/1968 | Reinhardt et al. | 72—245 X |

MILTON S. MEHR, Primary Examiner

U.S. Cl. X.R.

72—16, 245